April 26, 1938.  H. D. GEYER  2,115,458

RESILIENT ENGINE MOUNT

Filed Oct. 26, 1933

INVENTOR
Harvey D. Geyer
BY
Spencer Hardman & Lehr
HIS ATTORNEYS

Patented Apr. 26, 1938

2,115,458

UNITED STATES PATENT OFFICE 2,115,458

RESILIENT ENGINE MOUNT

Harvey D. Geyer, Dayton, Ohio, assignor, by mesne assignments, to General Motors Corporation, Detroit, Mich., a corporation of Delaware Application October 26, 1933, Serial No. 695,273

3 Claims. (Cl. 248—358)

This invention relates to yieldable connectors having non-metallic resilient material such as rubber interposed between metal parts so as to break metallic connection between the connected members, such as an automobile engine and its support.

Applicant's prior Patent No. 1,828,402, October 20, 1931, discloses a somewhat similar form of yieldable connector. The present invention provides a connector which is more yieldable, particularly in an axial direction, than the connector of said prior patent, due to the yieldability of the pneumatic chamber thereof.

An object of this invention therefore is to provide an improved universally yieldable connector having a pneumatic chamber therein which materially increases the yieldability thereof.

A special object of this invention is to provide such a yieldable connector which will yield much more readily in one direction, such as axially, than in another direction, such as laterally or perpendicular to the axis thereof.

Another feature of the invention is the vulcanized bond between the resilient rubber block and the inner metal head, whereby the rubber is firmly fixed and prevented from ever slipping relative to said head when distorted, which results in greatly improved efficiency and longer life in use.

Further objects and advantages of the present invention will be apparent from the following description, reference being had to the accompanying drawing, wherein a preferred embodiment of one form of the present invention is clearly shown.

In the drawing:

Fig. 3 is a section through the outer metal cup.

Fig. 4 is an elevation of the special nut to be inserted into the recess in the bottom of the metal cup.

Fig. 5 is a section through the metal head with the resilient rubber block vulcanized thereupon but shows the right half of the metal head in elevation.

Similar reference characters refer to similar parts throughout the several views.

Figure 1:
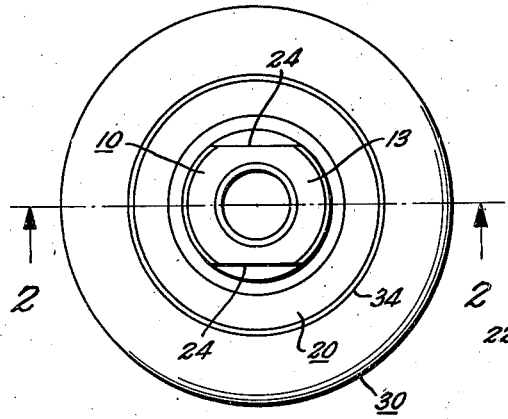
Fig. 1 is a plan view of the unitary connector of this invention shown separate from the connected parts.

10 designates the inner metal head, which is preferably of malleable iron or a steel forging, having an integral downwardly flared circular flange 11 forming a lower cupped end 12 thereon. The shank portion 13 of the head 10 has a central threaded hole 14 adapted to receive a bolt 16 for rigidly attaching head 10 to its connected metal member 15. A resilient molded rubber block 20 of the shape clearly shown in Fig. 5 is preferably vulcanized directly upon the metal head 10 by properly locating the head 10 as an insert in the vulcanizing mold in a manner which will be clear to those skilled in this art.

Figure 2:
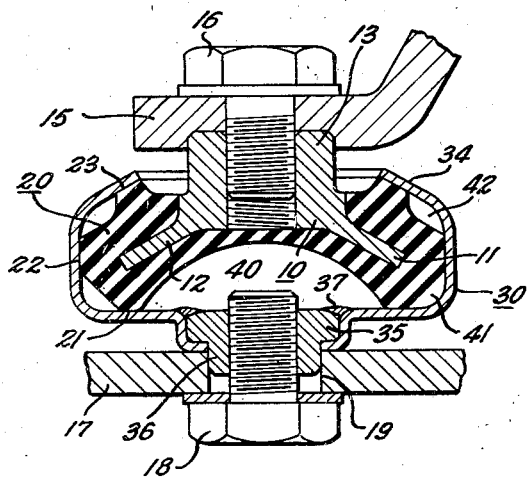
Fig. 2 is a section on line 2—2 of Fig. 1 but shows the connected members fixed to the unitary connector.
Figure 3:
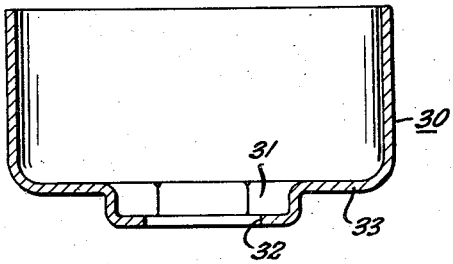

The outer metal cup 30 is first drawn to the shape shown in Fig. 3, having a hexagon shaped recess 31 and an aperture 32 in its bottom wall 33. The special nut 35 fits snugly within the correspondingly shaped recess 31 and its shank portion 36 projects through the hole 32 in cup 30, as clearly shown in Fig. 2. Preferably nut 35 is arc-welded to cup 30 at 37 to provide in effect an integral structure.

Figure 5:
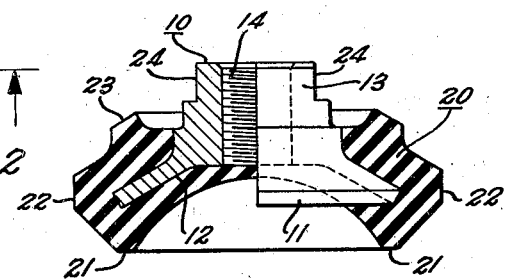
Figs. 3, 4 and 5 show the three parts of the connector as they appear just prior to assembling.
Figure 4:
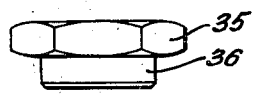

After nut 35 is fixed in place the unit shown in Fig. 5 is pressed snugly into the open cup 30 shown in Fig. 3, and then the upper edges of cup 30 are forced inwardly by a suitable die, as shown at 34 in Fig. 2, until the rubber block is under a substantial initial compression. When this is done air is trapped in the axial air chamber 40 and the two peripherally extending air chambers 41 and 42 of relative small cross section. The air in chamber 40 is preferably substantially sealed by the pressure of the rubber block 20 upon the cup bottom 33 over the relatively small annular area 21. Similarly the air in chambers 41 and 42 is preferably substantially sealed by the pressure of the rubber block 20 upon cup 30 over the relatively small annular areas 22 and 23. Air cannot escape from chamber 40 around nut 35 due to the weld 37, and the threads of bolt 18 threaded into the nut 35 are preferably covered with a suitable sealing compound to substantially seal against the escape of air around the threads. Thus air will be permanently trapped in chamber 40 and it will therefore function as a pneumatic chamber when the inner metal head 10 and the outer cup 30 move axially relative to one another.

To mount an automobile engine upon its chassis frame by means of the connector of this invention, the connector is set upon the supporting member 17 of the chassis frame with the shank 36 extending partly within a hole 19 in member 17 and then bolt 18 applied and drawn tight to rigidly fix cup 30 to member 17. The engine is then put in position so that its support arm 15 rests upon the top of the projecting shank 13 of head 10 and is rigidly fixed thereto by the bolt 16. Preferably shank 13 has two flats 24 thereon and extends within a correspondingly shaped recess in the engine support arm 15 to more rigidly fix arm 15 to the head 10 and prevent relative turning. These connectors obviously may be located on the engine wherever desired to provide for its proper resilient support. Ordinarily a single connector is located on each side of the engine so as to permit and resiliently cushion and absorb a desired amount of lateral rocking of the engine.

In operation, the connector yields in an axial direction, or vertically when arranged as illustrated in the drawing, by an internal distortion of the rubber block 20 and the alternate compression and rarefaction of the air trapped in the pneumatic chamber 40. Since air can be readily compressed to reduce its volume while resilient rubber cannot, it is obvious that this connector is much more yieldable axially than it would be if the chamber 40 were filled with resilient rubber. At the same time it can support a considerable axial load due to the assistance given by the compressed air in chamber 40. Relative lateral movement between head 10 and cup 30 is resisted entirely by the resilient distortion of the rubber block 20 since air can flow around the annular air chambers 41 and 42. Thus the lateral yieldability of the connector is substantially independent of its axial yieldability and can be made as great or as small as desired, dependent primarily upon the extent of the lateral bearing area of rubber block 20 upon cup 30, that is upon the width of the peripheral annular area 22. In the form illustrated the width of area 22 is such that the connector will yield axially more readily than laterally.

While the form of embodiment of the present invention as herein disclosed, constitutes a preferred form, it is to be understood that other forms might be adopted, all coming within the scope of the claims which follow.

What is claimed is as follows:

1. A yieldable connector for connecting two members, comprising: a metal cup having means for fixing to one of said connected members, a metal head inserted within said cup and having means for fixing to the other connected member, and a unitary molded resilient rubber block substantially embedding said head and supporting same within said cup, said block being so shaped as to provide a substantially sealed pneumatic chamber located axially between said head and cup and a peripherally extending pneumatic chamber located laterally between said rubber block and cup.

2. A yieldable connector for connecting two members, comprising: a metal cup having means for fixing to one of said connected members, a metal head inserted within said cup and having means for fixing to the other connected member, a unitary molded resilient rubber block substantially embedding said head and supporting same within said cup, said block having separate cavities molded therein and providing a substantially sealed pneumatic chamber located axially between said head and cup, and a peripherally extending pneumatic chamber located laterally between said block and cup.

3. A yieldable connector for connecting two members, comprising: a metal cup having means for fixing to one of said connected members, a metal head inserted within said cup and having means for fixing to the other connected member, and a unitary resilient rubber block supporting said head within said cup, said block having separate cavities molded therein, one of said cavities providing a substantially sealed pneumatic chamber located axially between said head and cup, and other of said cavities providing two axially spaced peripheral pneumatic chambers located laterally between said rubber block and cup.

HARVEY D. GEYER.